(12) United States Patent
Desai et al.

(10) Patent No.: US 10,609,574 B2
(45) Date of Patent: Mar. 31, 2020

(54) SEAMLESS WIRELESS LOCAL AREA NETWORK UPGRADE USING DYNAMIC COVERAGE ESTIMATIONS

(71) Applicant: Cisco Technology, Inc., San Jose, CA (US)

(72) Inventors: Vishal S. Desai, San Jose, CA (US); Pooya Monajemi, Irvine, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/001,212

(22) Filed: Jun. 6, 2018

(65) Prior Publication Data
US 2019/0380048 A1    Dec. 12, 2019

(51) Int. Cl.
*H04W 24/02*  (2009.01)
*H04L 12/24*  (2006.01)
*H04W 84/12*  (2009.01)
*H04W 88/08*  (2009.01)

(52) U.S. Cl.
CPC ......... *H04W 24/02* (2013.01); *H04L 41/0823* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,113,652 A | 9/2000 | Lysik et al. | |
| 7,716,077 B1* | 5/2010 | Mikurak | G06Q 10/06 705/7.12 |
| 8,428,036 B2 | 4/2013 | Herscovici et al. | |
| 9,867,083 B2 | 1/2018 | Liu et al. | |
| 10,164,858 B2* | 12/2018 | Gunasekara | H04L 43/0811 |
| 2008/0137621 A1 | 6/2008 | Bheda et al. | |

(Continued)

OTHER PUBLICATIONS

"Afraid to Upgrade Because of Network Downtime?", Airheads Community, Blogs, Technology Blog, Jun. 14, 2017, http://community.arubanetworks.com/t5/blogs/blogarticleprintpage/blog-i . . . , 4 pages.

*Primary Examiner* — Michael J Moore, Jr.
(74) *Attorney, Agent, or Firm* — Edell, Shapiro & Finnan, LLC

(57) ABSTRACT

Techniques for a seamless wireless local area network upgrade using dynamic coverage estimations are described. In one embodiment, a method includes determining, at a network controller of a wireless local area network (WLAN) comprising a plurality of wireless access points, a first set of wireless access points that provide redundant wireless connectivity to client devices. The method also includes determining, at the network controller, a second set of wireless access points among a remaining group of wireless access points excluding the first set of wireless access points that provide redundant wireless connectivity to client devices. The method includes performing a first upgrade of software associated with each wireless access point in the first set of wireless access points. Upon completion of the first upgrade, the method includes performing a second upgrade of software associated with each wireless access point in the second set of wireless access points.

20 Claims, 9 Drawing Sheets

(56) References Cited

U.S. PATENT DOCUMENTS

| | | | |
|---|---|---|---|
| 2009/0007135 A1* | 1/2009 | Rathunde | G06F 8/65 |
| | | | 718/107 |
| 2015/0085745 A1* | 3/2015 | Atreya | H04W 16/18 |
| | | | 370/328 |
| 2016/0371074 A1* | 12/2016 | Vyas | G06F 8/654 |
| 2017/0195459 A1* | 7/2017 | e Costa | H04L 67/34 |
| 2017/0207956 A1* | 7/2017 | Cabral | H04W 4/50 |
| 2017/0324439 A1 | 11/2017 | Desai et al. | |
| 2017/0325104 A1* | 11/2017 | Desai | H04B 1/48 |
| 2018/0115918 A1* | 4/2018 | Arjun | H04L 41/0672 |

* cited by examiner

SEAMLESS WIRELESS LOCAL AREA NETWORK UPGRADE USING DYNAMIC COVERAGE ESTIMATIONS

TECHNICAL FIELD

This disclosure relates to wireless communication networks.

BACKGROUND

During a software upgrade or update, an access point in a wireless communication network may be temporarily unavailable to provide wireless connectivity. When a software upgrade or update is deployed across multiple access points in a wireless communication network, the upgrade/update can cause downtime to the entire network. This downtime can result in a loss of connectivity for a period of time, which may not be acceptable for some wireless client devices servicing voice applications or other mission critical applications, such as medical applications.

DESCRIPTION OF EXAMPLE EMBODIMENTS

Overview

Presented herein are techniques for a seamless wireless local area network upgrade using dynamic coverage estimations. In an example embodiment, a method includes determining, at a network controller of a wireless local area network (WLAN) comprising a plurality of wireless access points, a first set of wireless access points in the WLAN that provide redundant wireless connectivity to client devices. The method also includes determining, at the network controller, a second set of wireless access points in the WLAN among a remaining group of wireless access points of the plurality of access points excluding the first set of wireless access points that provide redundant wireless connectivity to client devices. The method includes performing a first upgrade of software associated with each wireless access point in the first set of wireless access points. Upon completion of the first upgrade, the method includes performing a second upgrade of software associated with each wireless access point in the second set of wireless access points.

Example Embodiments

Wireless local area network (WLAN) software upgrades and/or updates can affect service to client devices connected to access points in the WLAN. Some WLAN administrators attempt to mitigate downtime due to software upgrades/updates by scheduling the upgrade process for overnight or weekends. However, such after-hours scheduled times for WLAN upgrades/updates are not always an option for WLAN deployments where network connectivity is mission critical, such as hospitals, warehouses, airports, and other environments. In these environments, upgrading WLAN software on access points and/or a network controller can cause several hours of downtime on the WLAN, which may lead to undesired effects, such as a lack of network connectivity or coverage holes in the WLAN.

According to the principles of the example embodiments described herein, techniques for a seamless wireless local area network upgrade using dynamic coverage estimations are presented that maintain network connectivity with minimal service effects to client devices.

Figure 1:
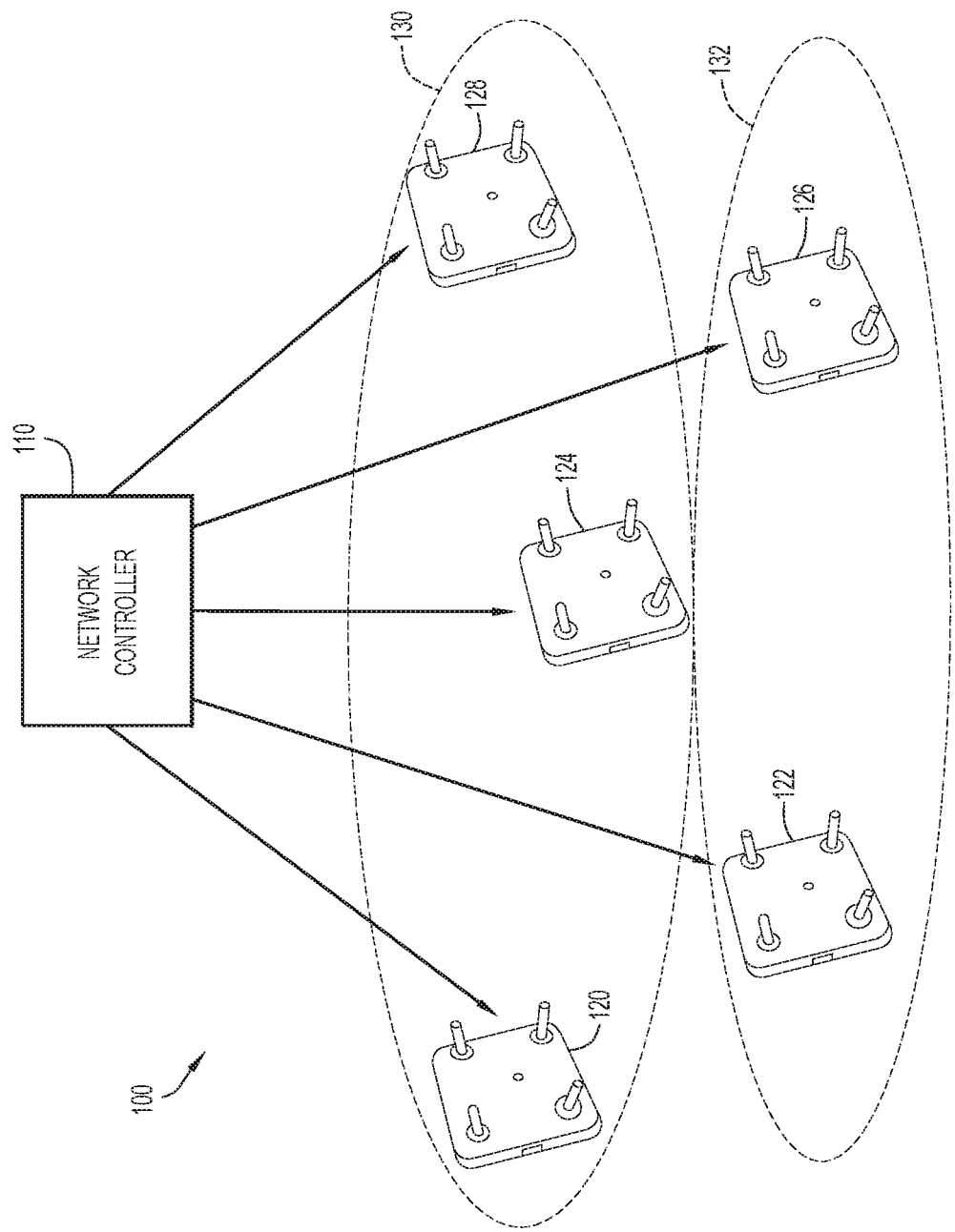
FIG. 1 is a diagram illustrating an environment in which techniques for a seamless wireless local area network upgrade using dynamic coverage estimations may be implemented, according to an example embodiment.

FIG. 1 is a diagram illustrating an environment 100 in which techniques for a seamless wireless local area network upgrade using dynamic coverage estimations may be implemented according to an example embodiment. In this embodiment, environment 100 includes a network controller 110 for a wireless local area network (WLAN) that includes a plurality of wireless access points. For example, in this embodiment, the WLAN includes a first access point 120, a second access point 122, a third access point 124, a fourth access point 126, and a fifth access point 128. It should be understood that in different environments a WLAN may include any number of wireless access points. Network controller 110 is configured to provide management and control of the WLAN, including plurality of wireless access points 120, 122, 124, 126, 128. In various embodiments, network controller 110 may be implemented in hardware, software, or a combination of both. For example, network controller 110 may be a dedicated apparatus and/or a virtual machine executed in software on an apparatus. Additionally, in some embodiments, functions of network controller 110 may be provided by a specific access point of plurality of wireless access points 120, 122, 124, 126, 128 that has been selected or chosen to act as a master/leader node.

Environment 100 also may include a plurality of client devices (not shown) connected to the WLAN through one or more of plurality of wireless access points 120, 122, 124, 126, 128. For example, the client devices may include any user equipment or other devices configured to communicate using the WLAN, such as cell phones, tablets, printers, computers, consumer electronics, Internet-of-Things (IoT) devices, as well as other devices that include equipment to establish a connection with the WLAN.

In the example embodiments described herein, techniques for a seamless wireless local area network upgrade using dynamic coverage estimations may be implemented by network controller 110. As will be described in more detail below, network controller 110 may be configured to use dynamic coverage estimations of network connectivity provided by plurality of wireless access points 120, 122, 124, 126, 128 to determine one or more sets of wireless access points that provide redundant wireless connectivity to client devices within the WLAN. Network controller 110 is configured to determine a set of wireless access points such that a remaining group of wireless access points, excluding the given set of redundant wireless access points, provides sufficient connectivity or coverage to client devices within the WLAN. In other words, a set of wireless access points that provides redundant wireless connectivity to client devices in the WLAN may be taken out of service without a loss of connectivity or coverage to client devices within the WLAN.

For example, as shown in FIG. 1, network controller 110 may use dynamic coverage estimations of network connectivity provided by plurality of wireless access points 120, 122, 124, 126, 128 to determine that a first set of wireless access points 130 that includes first access point 120, third access point 124, and fifth access point 128 provides redundant wireless connectivity to client devices within the WLAN in environment 100. That is, if first set of wireless access points 130 was taken out of service, sufficient connectivity and/or coverage may be provided to client devices by the remaining wireless access points (e.g., second access point 122 and fourth access point 126) in the WLAN of environment 100. Network controller 110 may further determine that a second set of wireless access points 132 that includes second access point 122 and fourth access point 126 also provides redundant wireless connectivity to client devices within the WLAN in environment 100. That is, if second set of wireless access points 132 was taken out of service, sufficient connectivity and/or coverage may be provided to client devices by the remaining wireless access points (e.g., first access point 120, third access point 124, and fifth access point 128).

Once first set of wireless access points 130 and second set of wireless access points 132 have been determined and identified by network controller 110, network controller 110 may begin to upgrade and/or update software associated with each wireless access point in a given set as a batch. For example, in FIG. 1, network controller 110 may perform a first upgrade or update of software associated with each wireless access point from first set of wireless access points 130 (e.g., first access point 120, third access point 124, and fifth access point 128). While these wireless access points are out of service during the software upgrade/update, sufficient connectivity and/or coverage is provided to client devices within the WLAN by the remaining wireless access points (e.g., second access point 122 and fourth access point 126).

Upon completion of the first upgrade/update, network controller 110 may then proceed to perform a second upgrade or update of software associated with each wireless access point from second set of wireless access points 132 (e.g., second access point 122 and fourth access point 126). Meanwhile, first set of wireless access points 130 (e.g., first access point 120, third access point 124, and fifth access point 128) are now back in service with software upgraded by the first upgrade. Accordingly, while the second set of wireless access points 132 are out of service during the second software upgrade/update, sufficient connectivity and/or coverage is provided to client devices within the WLAN by the remaining wireless access points (e.g., first access point 120, third access point 124, and fifth access point 128). With this arrangement, a seamless WLAN upgrade may be implemented.

Additionally, in some embodiments, an N+1 model may be implemented for performing network upgrades. In such an embodiment, a WLAN may include at least two network controllers, including a primary network controller and a secondary network controller. In the N+1 model, the secondary network controller is upgraded prior to implementing any software upgrades throughout the rest of the WLAN. Once the secondary network controller has been upgraded, then all of the access points in the WLAN may be moved to this upgraded secondary network controller in order to implement the techniques for a seamless wireless local area network upgrade described herein.

Figure 2:
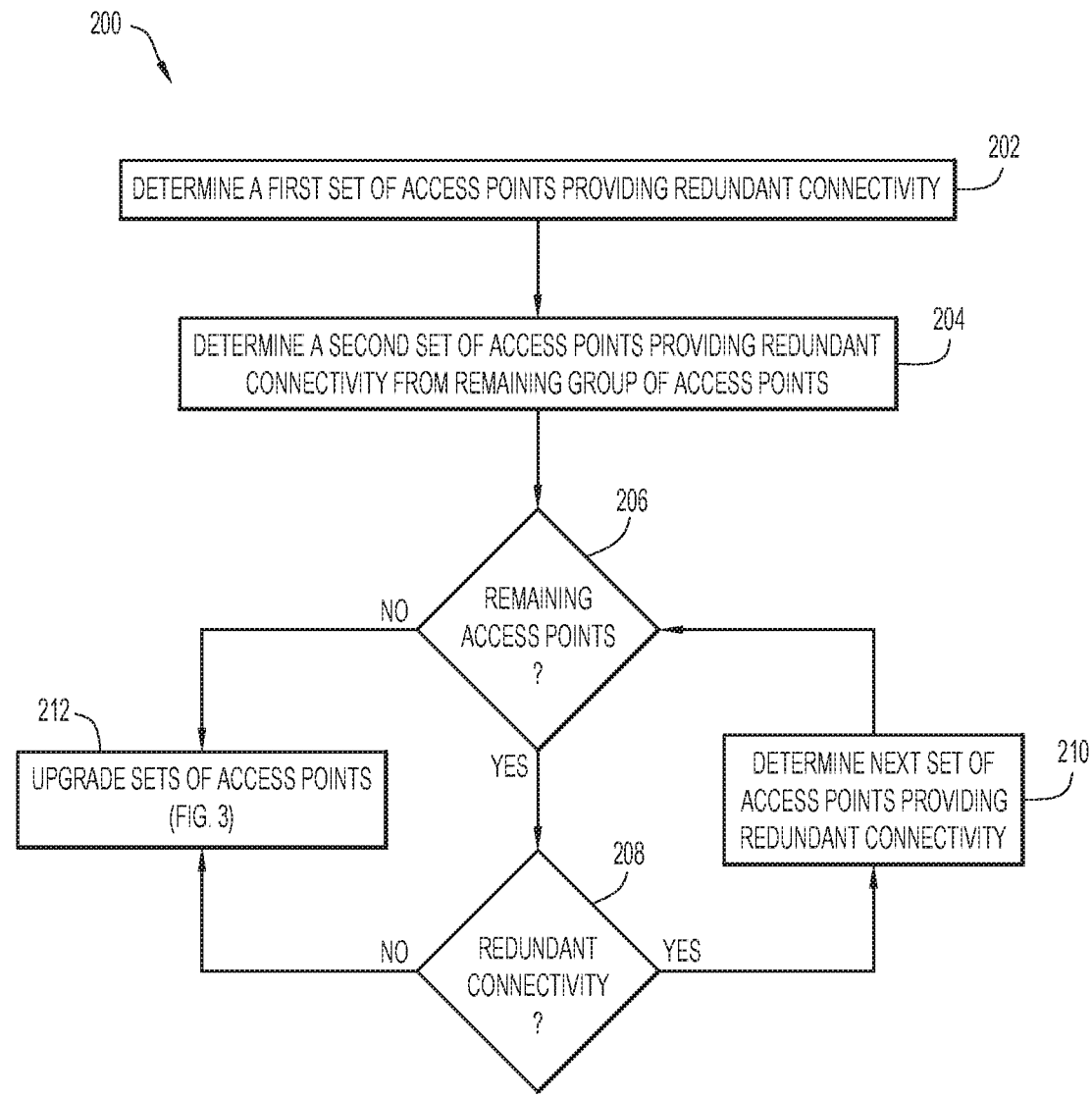
FIG. 2 is a flowchart illustrating a method of using dynamic coverage estimations to determine sets of redundant access points, according to an example embodiment.
Figure 3:
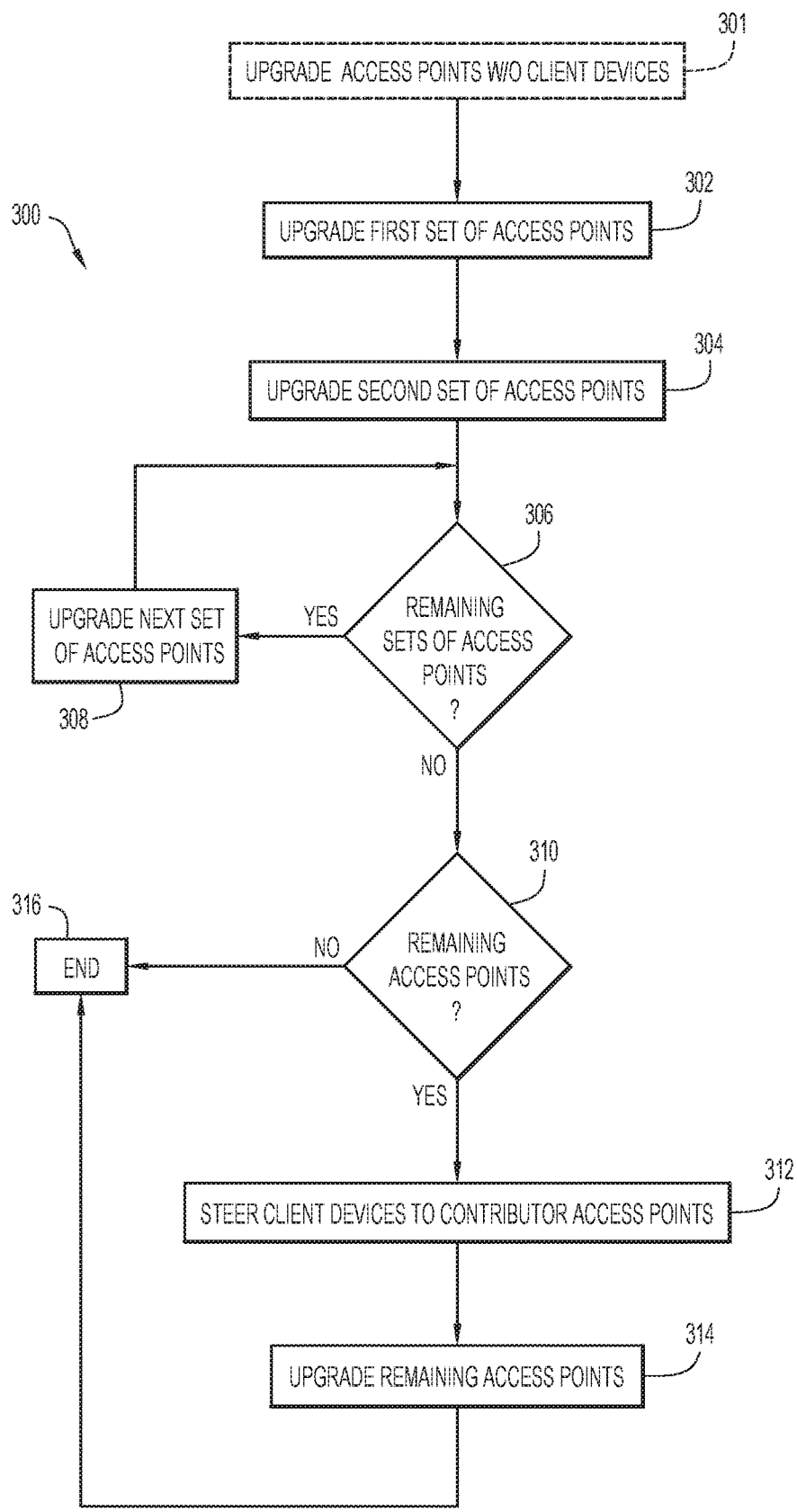
FIG. 3 is a flowchart illustrating a method of upgrading sets of access points in a sequence to provide a seamless wireless local area network upgrade, according to an example embodiment.

Techniques for a seamless wireless local area network upgrade using dynamic coverage estimations may be described in more detail in reference to flowcharts for the methods shown in FIGS. 2 and 3. Referring first to FIG. 2, a method 200 of using dynamic coverage estimations to determine sets of wireless access points that provide redundant wireless connectivity to client devices within a WLAN is shown. In an example embodiment, method 200 may be implemented by a network controller, for example, network controller 110.

As an initial matter, if a WLAN includes any wireless access points that are not serving or providing wireless connectivity to client devices, those wireless access points may be immediately upgraded with the software upgrade/update prior to the initiation of method 200. Because these access points are not being used by any client devices, any downtime associated with performing the software upgrade/update will not cause a loss of connectivity or coverage. Once the client-free wireless access points have completed the software upgrade/update, these upgraded wireless access points are available within the WLAN to provide dedicated wireless connectivity during subsequent batch upgrades of software for sets of wireless access points.

Method 200 may begin with an operation 202 where a first set of wireless access points that provides redundant wireless connectivity to client devices within the WLAN is determined. Operation 202 may be implemented using a technique that determines dynamic coverage estimations for the wireless access points in the WLAN. For example, Flexible Radio Assignment (FRA) techniques may be used to detect and determine redundant wireless connectivity for wireless access points in a WLAN, such as the FRA techniques described in U.S. Patent Application Publication No. 2017/0324439 to Desai et al., entitled "Flexible Radio Assignment" and/or U.S. Patent Application Publication No. 2017/0325104 to Desai et al., entitled "Determining Redundant Radios", the disclosures of which applications are hereby incorporated by reference in their entirety.

Generally, FRA techniques may be used to identify a basic service set (BSS) of wireless access points that provides adequate connectivity and/or coverage in a given environment so that additional or extra access points may be transformed to provide various kinds of other services. According to the principles of the example embodiments described herein, FRA techniques may be further used dynamically to iterate through multiple determinations of sets of wireless access points (BSSs) that are needed for adequate connectivity and/or coverage in a given environment. From each BSS that is determined, a corresponding set of redundant wireless access points that are not needed to provide connectivity and/or coverage in the environment can also be determined. Accordingly, it is this set of redundant wireless access points that is determined at operation 202. In other words, the first set of wireless access points that provides redundant wireless connectivity to client devices within the WLAN determined at operation 202 is based on identifying a BSS among all of the wireless access points in the WLAN that are able to provide adequate connectivity and/or coverage in the environment.

In some embodiments, the iterations of identifying BSSs to provide adequate connectivity and/or coverage in a given environment may performed using both the 2.4 GHz and the 5 GHz frequency bands, or solely using the 5 GHz frequency band, to prevent any coverage holes in the spectrum. Performing the iterations in the 5 GHz frequency band may be made with the assumption that the 5 GHz coverage cell size will be a subset of a respective 2.4 GHz frequency band transmit cell size, due to differences in the spectrum and/or modulation.

Next, method 200 includes an operation 204 where a second set of wireless access points that provides redundant wireless connectivity to client devices within the WLAN is determined. At operation 204, the second set of wireless access points are determined from a remaining group of access points in the WLAN that excludes the first set of wireless access points already determined at operation 202. That is, at operation 204, the first set of wireless access points from operation 202 (as well as any client-free access points already upgraded) are considered to be static or fixed, and, therefore, available to provide connectivity and/or coverage to client devices within the WLAN.

Method 200 includes an operation 206 where whether any wireless access points are remaining in the WLAN that are not already included in the first set from operation 202 or the second set from operation 204 (not including any client-free access points that have already been upgraded) is determined. Upon determining at operation 206 that there are remaining access points, method 200 proceeds to an operation 208. At operation 208, another iteration of determining a BSS is performed to determine whether any of the remaining access points provide redundant wireless connectivity to client devices in the WLAN. Upon determining at operation 208 that there are additional redundant wireless access points, method 200 proceeds to an operation 210 where a next set of wireless access points that provides redundant wireless connectivity to client devices within the WLAN is determined from a remaining group of access points in the WLAN that excludes the first set of wireless access points already determined at operation 202, the second set of wireless access points already determined at operation 204, and any previous next sets determined during a previous iteration of operation 210. That is, once a wireless access point has been included in a set of wireless access points that provides redundant wireless connectivity during any of operations 202, 204, 210, it will be excluded from subsequent determinations of remaining redundant wireless access points.

After operation 210, method 200 proceeds back to operation 206 where another iteration of operations 206, 208, 210 are performed until no further wireless access points are remaining. In an example embodiment, each of the sets of redundant access points determined at operations 202, 204, 210 may be included as a list or data stored in memory at a network controller (e.g., network controller 110).

Upon determining at operation 206 that no wireless access points in the WLAN are remaining (i.e., each wireless access point has been included in a set of redundant access points determined at operations 202, 204, 210), method 200 may proceed to an operation 212 where software for each set of redundant wireless access points is batch upgraded/updated in a sequential manner, as described in more detail in reference to the flowchart of a method 300 shown in FIG. 3.

Additionally, upon determining at operation 208 that the plurality of wireless access points in the WLAN include additional wireless access points that do not provide redundant wireless connectivity to client devices, method 200 may proceed to operation 212. At operation 208, the additional wireless access points for which no redundant wireless connectivity to client devices within the WLAN is available may be included as a list or data stored in memory at a network controller (e.g., network controller 110) for subsequent steering operations of method 300, described below in reference to FIG. 3.

Referring now to FIG. 3, a flowchart illustrating method 300 of upgrading sets of wireless access points in a sequence to provide a seamless wireless local area network upgrade is shown, according to an example embodiment. In an example embodiment, method 300 may be implemented by a network controller (e.g., network controller 110). Additionally, as previously described, prior to implementing method 300, any client-free wireless access points (i.e., access points not currently providing wireless connectivity to client devices) may have the upgrade/update to software performed at an operation 301 that may be initiated immediately or prior to upgrading the software of the one or more sets of redundant access points according to method 300. It should be noted that operation 301 is optional and may not be included in method 300.

Method 300 may be initiated upon completion of method 200, i.e., as part of operation 212 of method 200, described above. Method 300 may begin at an operation 302 where a first upgrade of the software associated with each wireless access point of the first set of wireless access points (e.g., determined at operation 202 of method 200) is performed. In other words, software of each access point that has been included in the first set of redundant access points is upgraded/updated together in a batch. As a result, while the access points of the first set of redundant access points are unavailable due to the software upgrade/update, the remaining wireless access points in the WLAN (including any client-free wireless access points that have already been upgraded) are available to provide connectivity and/or coverage to client devices within the WLAN.

Next, upon completion of operation 302, and once the wireless access points from the first set of redundant access points are operational with the upgraded/updated software, method 300 may proceed to an operation 304. At operation 304, a second upgrade of the software associated with each wireless access point of the second set of wireless access points (e.g., determined at operation 204 of method 200) is performed. As in the previous operation, while the access points of the second set of redundant access points are unavailable due to the software upgrade/update, the upgraded first set of redundant access points from operation 302 and any other remaining wireless access points in the WLAN (including any client-free wireless access points that have already been upgraded) are available to provide connectivity and/or coverage to client devices within the WLAN.

Method 300 may proceed to an operation 306 to determine whether there are any remaining sets of redundant access points that were determined according to method 200. Upon determining that there are remaining sets of redundant access points at operation 306, method 300 proceeds to an operation 308. At operation 308, software associated with each wireless access point of the next set of redundant access points is upgraded/updated. Upon completion of the upgrade at operation 308, method 300 returns to operation 306 to determine whether there are any remaining sets of redundant access points and to perform further iterations of upgrades/updates at operation 308.

Upon determining at operation 306 that there are no remaining sets of redundant access points, method 300 may proceed to an operation 310. At operation 310 it is determined whether there are any remaining wireless access points that have not yet been upgraded during the software upgrades/updates performed during the first upgrade (e.g., performed at operation 302), the second upgrade (e.g., performed at operation 304), as well as any one or more iterations of upgrades for next sets of redundant access points (e.g., performed at iterations of operation 308). Upon determining at operation 310 that there are no remaining wireless access points, method 300 may end at operation 316.

Upon determining at operation 310 that there are remaining wireless access points, method 300 proceeds to an operation 312. For example, at operation 310, there may be additional wireless access points for which no redundant wireless connectivity to client devices within the WLAN is available (e.g., determined in accordance with operation 208 of method 200 above). At operation 312, each of the remaining wireless access points may have client devices that are connected to the access point steered to contributor wireless access points in the WLAN. For example, client device steering may be performed using techniques included or defined by The Institute of Electrical and Electronics Engineers (IEEE) 802.11v standard for BSS Transition Management (also referred to as 11v BSS Transition), IEEE 802.11h standard for Channel Switch Announcement (CSA), and/or by de-authentication of the affected wireless access point.

Using any of these suitable techniques, the client devices that were using or connected to each of the remaining wireless access points are instead steered to contributor wireless access points, such as any of the wireless access points in the WLAN that have already been upgraded in any one or more of operations 302, 304, and/or 308 of method 300. In some cases, client devices associated with a strong signal (i.e., determined based on Received Signal Strength Indicator (RSSI)) that are steered to these contributor wireless access points may experience a slightly deteriorated signal, but will still have network connectivity available.

Next, at an operation 314, once client devices have been steered to the contributor wireless access points at operation 312, an upgrade/update of the software associated with each of the additional remaining wireless access points is performed.

Once each of the additional remaining wireless access points has been upgraded/updated at operation 314, method 300 may end at operation 316. Upon completion of method 300, all of the wireless access points in the WLAN will be operating using upgraded/updated software. With this arrangement, seamless WLAN upgrade may be implemented.

Figure 4:
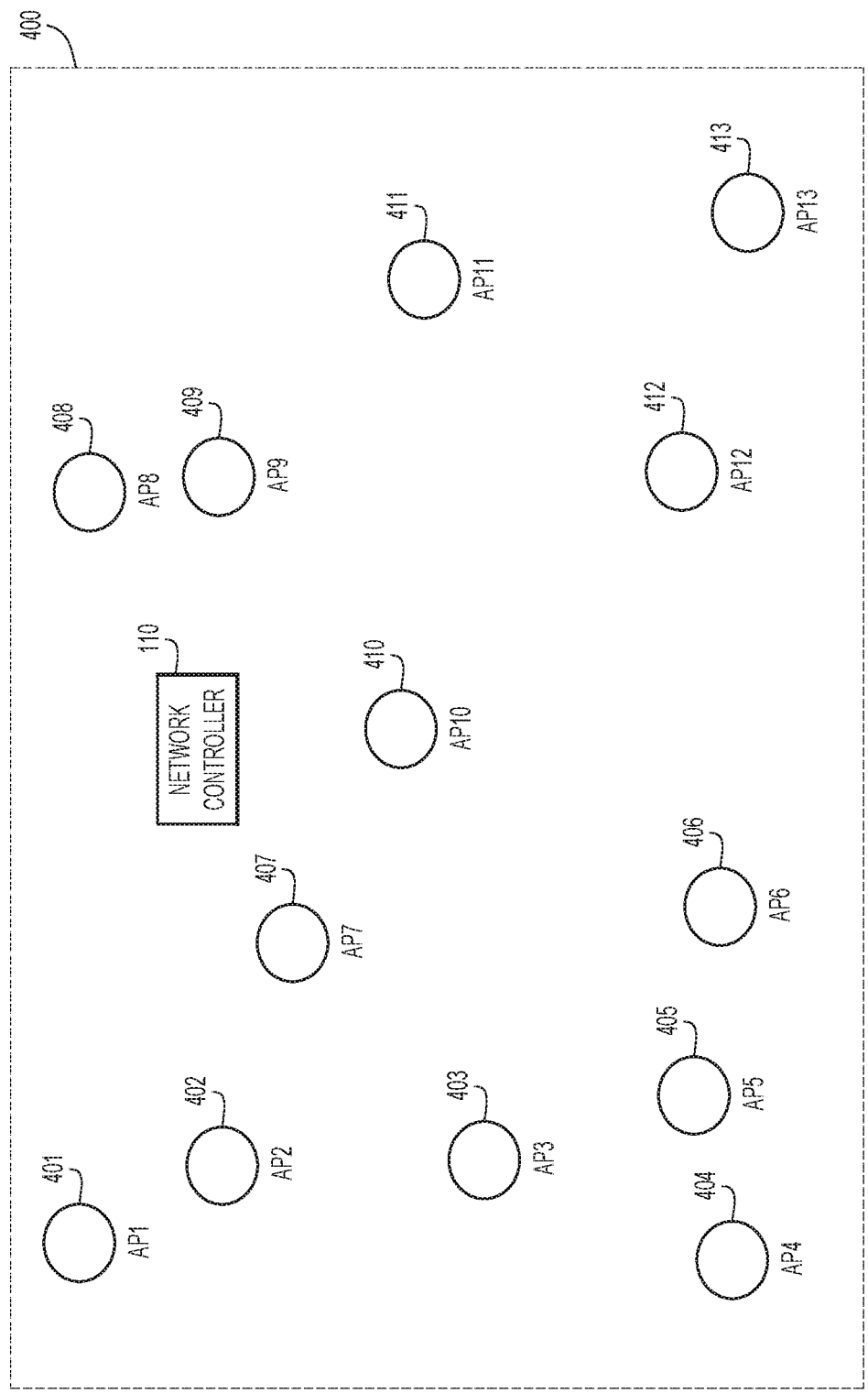
FIG. 4 is a diagram illustrating a wireless local area network in which a seamless upgrade using dynamic coverage estimations may be implemented, according to an example embodiment.

The techniques for a seamless wireless local area network upgrade using dynamic coverage estimations described above in reference to the flowcharts for methods 200 and 300 shown in FIGS. 2 and 3 may be explained in reference to a representative WLAN 400 illustrated in FIGS. 4 through 8. Referring first to FIG. 4, representative WLAN 400 in which a seamless upgrade using dynamic coverage estimations may be implemented includes a network controller, for example, network controller 110, and a plurality of wireless access points. In this embodiment, the plurality of wireless access points includes a first access point 401 (AP1), a second access point 402 (AP2), a third access point 403 (AP3), a fourth access point 404 (AP4), a fifth access point 405 (AP5), a sixth access point 406 (AP6), a seventh access point 407 (AP7), an eighth access point 408 (AP8), a ninth access point 409 (AP9), a tenth access point 410 (AP10), an eleventh access point 411 (AP11), a twelfth access point 412 (AP12), and a thirteenth access point 413 (AP13). It should be understood that while representative WLAN 400 includes thirteen wireless access points, a WLAN may include any number of wireless access points.

In some embodiments, one or more of plurality of wireless access points 401-413 in WLAN 400 may be client-free wireless access points (i.e., access points not currently providing wireless connectivity to client devices). For example, in this embodiment, first access point 401 (AP1) and eighth access point 408 (AP8) may be client-free access points. Accordingly, prior to initiating or performing any software upgrades/updates to the remaining wireless access points, first access point 401 (AP1) and eighth access point 408 (AP8) may have upgrades/updates to software performed immediately. As a result, the software associated with first access point 401 (AP1) and eighth access point 408 (AP8) is upgraded/updated and these access points are available to provide connectivity to client devices during subsequent upgrades of the sets of redundant wireless access points. In some embodiments, once a wireless access point has had its software upgraded/updated, it may be included in an associated list or data stored in memory at network controller 110 that keeps track of which wireless access points have been upgraded.

Figure 5:
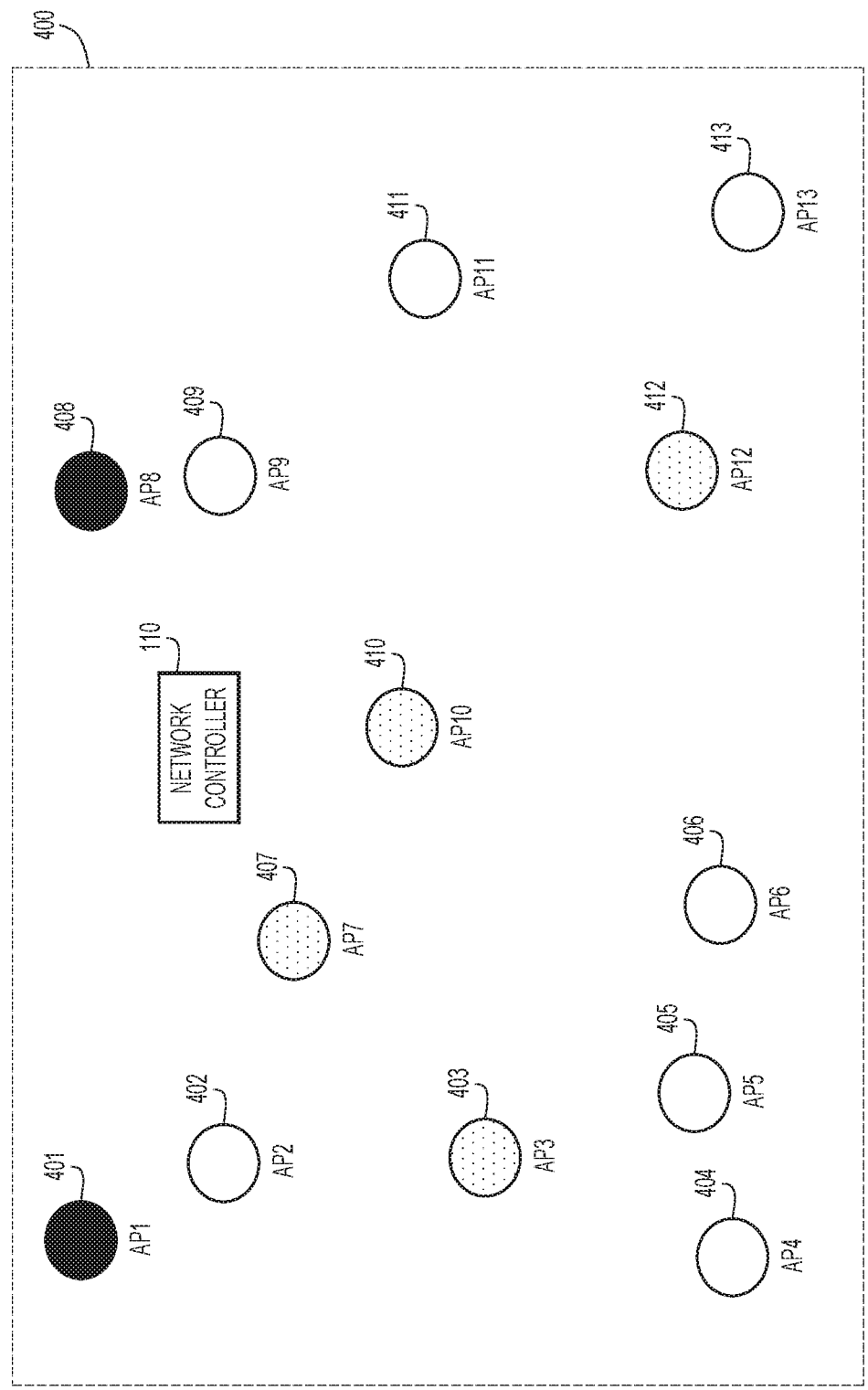
FIG. 5 is a diagram illustrating a first set of redundant access points in a wireless local area network, according to an example embodiment.

As shown in FIG. 5, software associated with first access point 401 (AP1) and eighth access point 408 (AP8) has been upgraded/updated and these access points are now considered static and available to provide wireless connectivity to client devices (indicated by a filled in circle in FIG. 5). Next, for the remaining wireless access points, network controller 110 initiates operations of method 200, described above, to determine a first set of wireless access points in WLAN 400 that provide redundant wireless connectivity to client devices (i.e., a first set of redundant access points). As shown in FIG. 5, the first set of redundant access points includes third access point 403 (AP3), seventh access point 407 (AP7), tenth access point 410 (AP10), and twelfth access point 412 (AP12) (indicated by stippled circles in FIG. 5).

Figure 6:
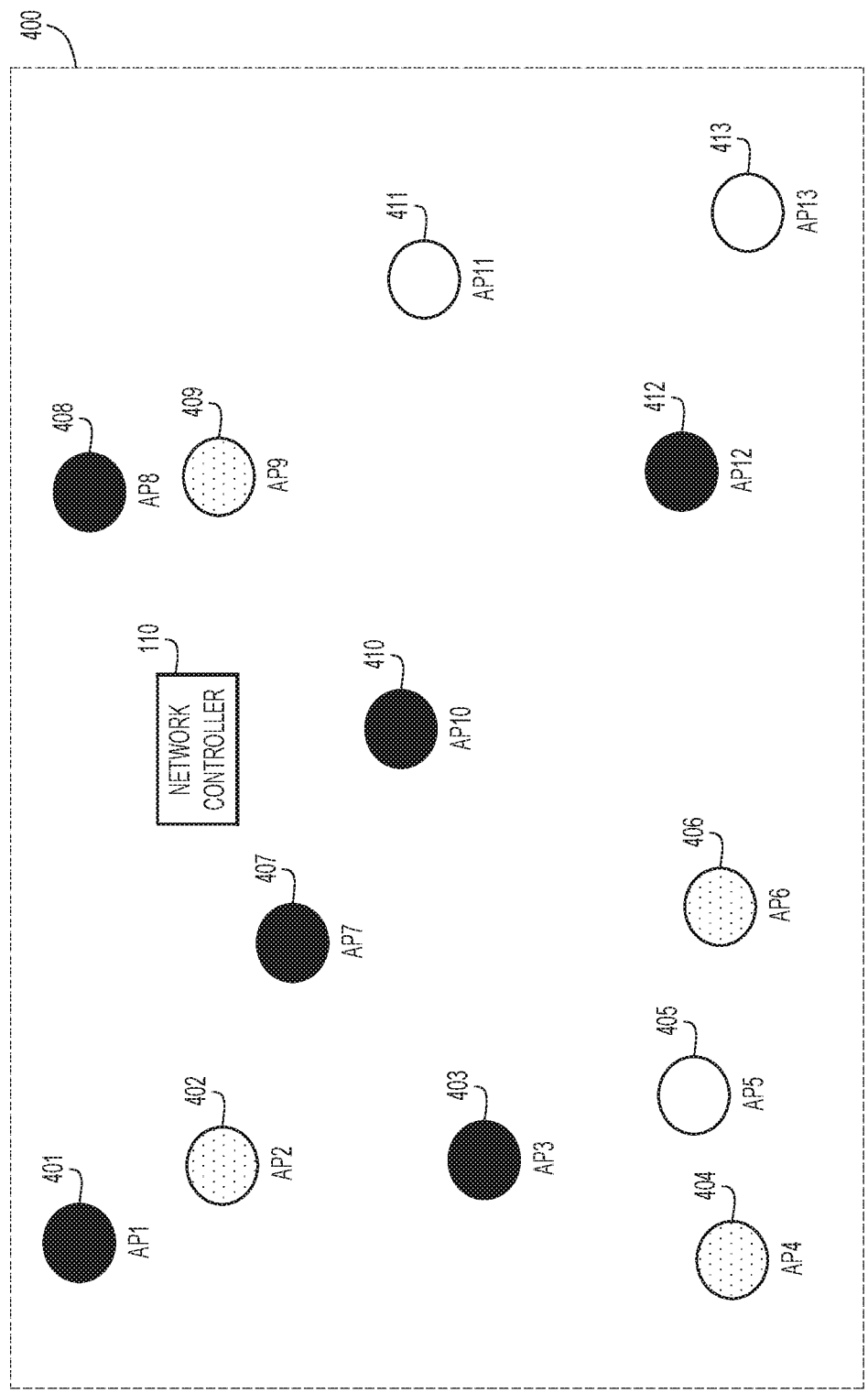
FIG. 6 is a diagram illustrating a second set of redundant access points in a wireless local area network, according to an example embodiment.

As shown in FIG. 6, each wireless access point of the first set of redundant access points is now considered static (indicated by a filled in circle in FIG. 6) and is excluded from the next set of redundant access points determined by network controller 110, as well as client-free access points that have already been upgraded (e.g., first access point 401 (AP1) and eighth access point 408 (AP8)). Next, network controller 110 initiates operations of method 200, described above, to determine a second set of wireless access points in WLAN 400 that provide redundant wireless connectivity to client devices (i.e., a second set of redundant access points) among a remaining group of wireless access points that excludes the first set of redundant access points (e.g., the remaining group includes access points 402, 404, 405, 406, 409, 411, 413).

In this embodiment, the second set of redundant access points includes second access point 402 (AP2), fourth access point 404 (AP4), sixth access point 406 (AP6), and ninth access point 409 (AP9) (indicated by stippled circles in FIG. 6).

Figure 7:
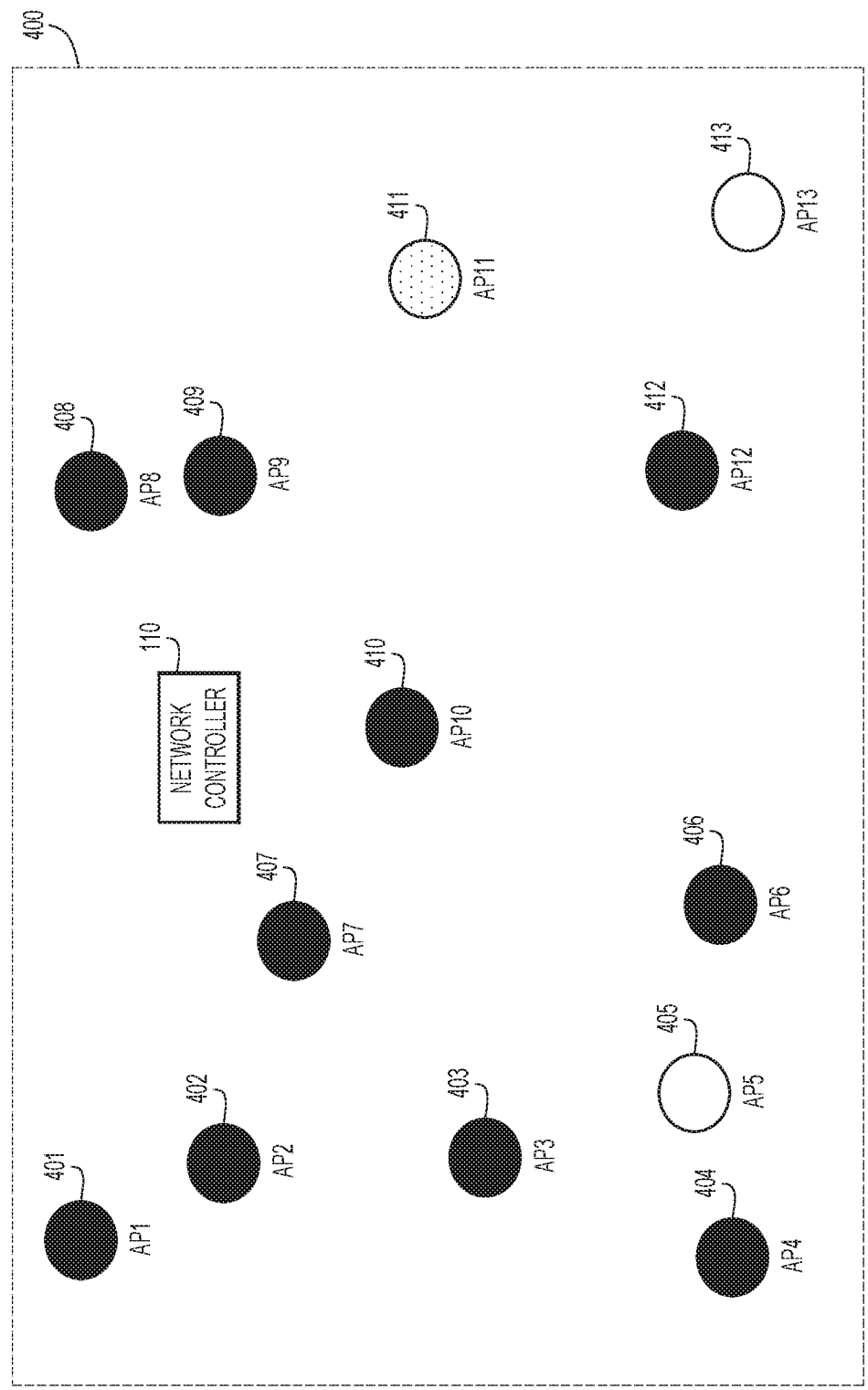
FIG. 7 is a diagram illustrating a next set of redundant access points in a wireless local area network, according to an example embodiment.

Next, as shown in FIG. 7, network controller 110 may initiate another iteration of determining whether there are any remaining sets of redundant wireless access points. For example, as described above in reference to operations 206, 208, 210 of method 200. In this embodiment, each wireless access point of the first set of redundant access points and the second set of redundant access points are now considered static (indicated by a filled in circle in FIG. 6) and is excluded from the next set of redundant access points determined by network controller 110, as well as client-free access points that have already been upgraded (e.g., first access point 401 (AP1) and eighth access point 408 (AP8)). Network controller 110 initiates operations of method 200, described above, to determine a next set of wireless access points in WLAN 400 that provide redundant wireless connectivity to client devices (i.e., a third set of redundant access points) among a remaining group of wireless access points that excludes the first set of redundant access points and the second set of redundant access points (e.g., the remaining group includes access points 405, 411, 413).

In this embodiment, the third set of redundant access points includes only one access point, eleventh access point 411 (AP11) (indicated by a stippled circle in FIG. 7).

Figure 8:
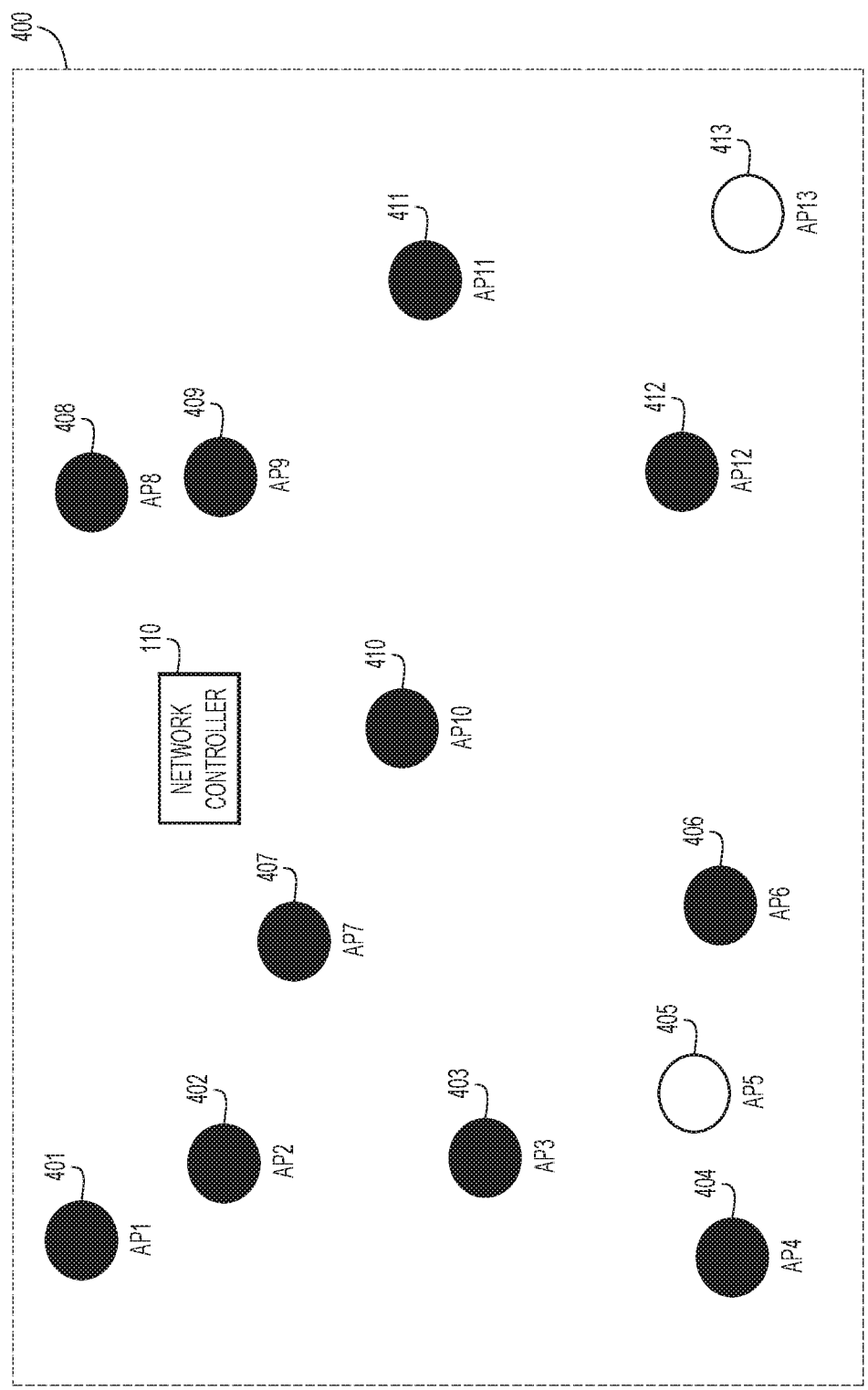
FIG. 8 is a diagram illustrating upgraded access points in a wireless local area network, according to an example embodiment.

Referring now to FIG. 8, two additional wireless access points remain, fifth access point 405 (AP5) and thirteenth access point 413 (AP13). In this embodiment, fifth access point 405 (AP5) and thirteenth access point 413 (AP13) represent additional wireless access points for which no redundant wireless connectivity to client devices is available within WLAN 400. As a result, client devices that are using or connected to fifth access point 405 (AP5) and thirteenth access point 413 (AP13) will need to be steered to contributor wireless access points, as described above, before the software associated with fifth access point 405 (AP5) and thirteenth access point 413 (AP13) may be upgraded/updated.

Using the techniques described herein for a seamless wireless local area network upgrade using dynamic coverage estimations, software associated with the plurality of wireless access points 401-413 may be upgraded/updated in batches corresponding to each determined set of redundant access points. For example, software associated with the plurality of wireless access points 401-413 may be upgraded/updated in accordance with operations of method 300, described above.

In this embodiment, the software associated with each wireless access point of the first set of redundant access points is upgraded/updated (e.g., third access point 403 (AP3), seventh access point 407 (AP7), tenth access point 410 (AP10), and twelfth access point 412 (AP12)) as described in reference to operation 302 of method 300. Once this first upgrade is completed, the software associated with each wireless access point of the second set of redundant access points is upgraded/updated (e.g., second access point 402 (AP2), fourth access point 404 (AP4), sixth access point 406 (AP06), and ninth access point 409 (AP09) as described in reference to operation 304 of method 300.

In this example, another set of redundant access points has been determined (i.e., third set of redundant access points), therefore, the software associated with each wireless access point of the third set of redundant access points is upgraded/updated (e.g., eleventh access point 411 (AP11)) as described in reference to operations 306, 308 of method 300. In this example, the third set of redundant access points is the last set, so method 300 would proceed to operation 312 to steer client devices from the additional wireless access points (e.g., fifth access point 405 (AP5) and thirteenth access point 413 (AP13)) before upgraded/updating the software associated with those additional wireless access points.

As shown in FIG. 8, network controller 110 may use FRA techniques, as described above, to steer client devices that are using or connected to fifth access point 405 (AP5) to neighboring contributor wireless access points. For example, in this embodiment, fourth access point 404 (AP4), third access point 403 (AP3), and/or sixth access point 406 (AP6) may be contributor wireless access points that may serve or provide wireless network connectivity to client devices of fifth access point 405 (AP5). Similarly, network controller 110 may steer client devices that are using or connected to thirteenth access point 413 (AP13) to neighboring contributor wireless access points. For example, in this embodiment, eleventh access point 411 (AP11) and/or twelfth access point 412 (AP12) may be contributor wireless access points that may serve or provide wireless network connectivity to client devices of thirteenth access point 413 (AP13).

Once network controller 110 has finished steering the client devices of fifth access point 405 (AP5) and thirteenth access point 413 (AP13) to neighboring contributor wireless access points, the software associated with fifth access point 405 (AP5) and thirteenth access point 413 (AP13) may then be upgraded/updated. For example, as described above in reference to operation 314 of method 300. Upon completion of this last upgrade, all of the wireless access points in WLAN 400 will be operating using upgraded/updated software. With this arrangement, a seamless WLAN upgrade may be implemented.

Figure 9:
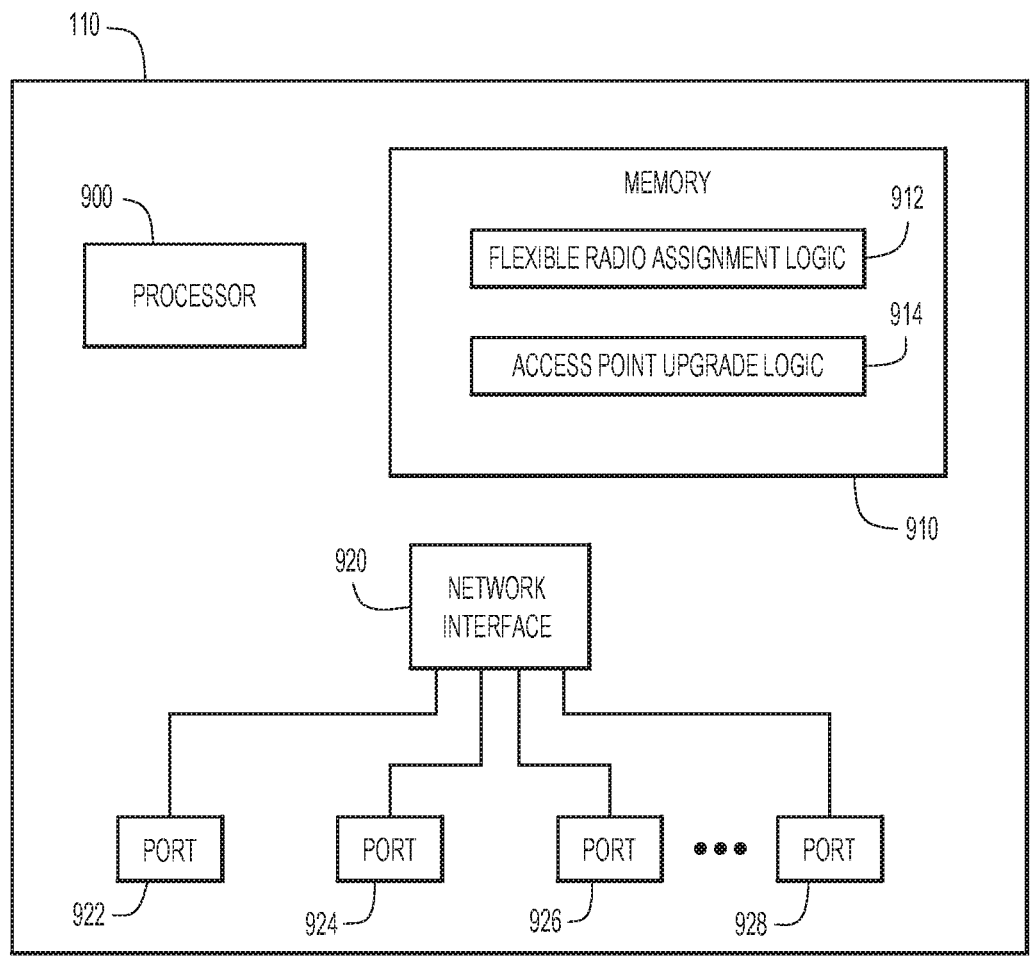
FIG. 9 is a block diagram of a network controller in which techniques for a seamless wireless local area network upgrade using dynamic coverage estimations may be implemented, according to an example embodiment.

FIG. 9 illustrates an example block diagram of a network controller (e.g., network controller 110) that may be configured to implement techniques for a seamless wireless local area network upgrade using dynamic coverage estimations according to the principles of the embodiments described herein.

In this embodiment, network controller 110 may include a processor 900 for processing information and may further include a bus (not shown) or other communication mechanism coupled with processor 900 for communicating the information. Network controller 110 may also include a memory 910 that stores instructions for execution by processor 900, and a network interface 920. Network interface 920 may include a plurality of ports 922, 924, 926, 928 to provide connections to allow and communication with a plurality of access points. While the figure shows a single block 900 for a processor, it should be understood that the processor 900 may represent a plurality of processing cores, each of which can perform separate processing.

In this embodiment, memory 910 may be read only memory (ROM), random access memory (RAM), magnetic disk storage media devices, optical storage media devices, flash memory devices, electrical, optical, or other physical/tangible memory storage devices. Thus, in general, memory 910 may comprise one or more tangible (non-transitory) computer readable storage media (e.g., a memory device) encoded with software comprising computer executable instructions and when the software is executed (by the processor 900) it is operable to perform the operations described herein. For example, one or more of flexible radio assignment logic 912 and access point software upgrade logic 914 is stored in memory 910 for providing one or more of the functions of network controller 110 described herein.

For example, flexible radio assignment logic 912 may cause network controller 110 to perform operations associated with determining sets of redundant access points and/or steering client devices to contributor wireless access points described above in connection with FIGS. 1-8 when executed by processor 900 from memory 910. Access point software upgrade logic 914 may cause network controller 110 to perform operations associated with upgrading/updating one or more wireless access points in the WLAN, as described above in connection with FIGS. 1-8, when executed by processor 900 from memory 910.

The example embodiments provide techniques to gradually implement a wireless local area network upgrade while maintaining service coverage and connectivity with little to no effect on service to client devices within the network. The example embodiments described herein use FRA techniques for estimating dynamic coverage overlap areas and neighbor contributions, as well as for client device steering, to implement a seamless network upgrade of software associated with all wireless access points in the wireless local area network.

The principles of the example embodiments described herein provide techniques for a seamless wireless local area network upgrade using dynamic coverage estimations. The techniques maintain network connectivity with minimal service effects to client devices by performing upgrades to software associated with wireless access points in sequential batches.

In summary, a method is provided comprising: determining, at a network controller of a wireless local area network (WLAN) comprising a plurality of wireless access points, a first set of wireless access points in the WLAN that provide redundant wireless connectivity to client devices; determining, at the network controller, a second set of wireless access points in the WLAN among a remaining group of wireless access points of the plurality of access points excluding the first set of wireless access points that provide redundant wireless connectivity to client devices; performing a first upgrade of software associated with each wireless access point in the first set of wireless access points; and upon completion of the first upgrade, performing a second upgrade of software associated with each wireless access point in the second set of wireless access points.

In another form, a non-transitory computer readable storage media encoded with instructions is provided that, when executed by a processor of a network controller of a wireless local area network (WLAN) comprising a plurality of wireless access points, cause the processor to: determine a first set of wireless access points in the WLAN that provide redundant wireless connectivity to client devices; determine a second set of wireless access points in the WLAN among a remaining group of wireless access points of the plurality of access points excluding the first set of wireless access points that provide redundant wireless connectivity to client devices; perform a first upgrade of software associated with each wireless access point in the first set of wireless access points; and upon completion of the first upgrade, perform a second upgrade of software associated with each wireless access point in the second set of wireless access points.

Furthermore, an apparatus is provided comprising: a plurality of network ports configured to communicate with a plurality of wireless access points in a wireless local area network (WLAN); a memory; a processor coupled to the memory and to the plurality of network ports, wherein the processor is configured to: determine a first set of wireless access points in the WLAN that provide redundant wireless connectivity to client devices; determine a second set of wireless access points in the WLAN among a remaining group of wireless access points of the plurality of access points excluding the first set of wireless access points that provide redundant wireless connectivity to client devices; perform a first upgrade of software associated with each wireless access point in the first set of wireless access points; and upon completion of the first upgrade, perform a second upgrade of software associated with each wireless access point in the second set of wireless access points.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a network controller of a wireless local area network (WLAN) comprising a plurality of wireless access points:
determining a first set of wireless access points in the WLAN that provide redundant wireless connectivity to client devices;
determining a second set of wireless access points in the WLAN among a remaining group of wireless access points of the plurality of access points excluding the first set of wireless access points that provide redundant wireless connectivity to client devices;
performing a first upgrade of software associated with each wireless access point in the first set of wireless access points;
upon completion of the first upgrade, performing a second upgrade of software associated with each wireless access point in the second set of wireless access points;
determining additional wireless access points among the plurality of wireless access points for which no redundant wireless connectivity to client devices of the WLAN is available;
steering client devices connected to the additional wireless access points to contributor access points associated with the first set of wireless access points and/or the second set of wireless access points; and
performing an upgrade of software for each of the additional wireless access points.

2. The method of claim 1, wherein while performing the first upgrade, the remaining group of wireless access points provides wireless connectivity to client devices within the WLAN.

3. The method of claim 1, wherein while performing the second upgrade, the first set of wireless access points including software upgraded by the first upgrade provides wireless connectivity to client devices within the WLAN.

4. The method of claim 1, further comprising:
prior to determining the first set of wireless access points, determining one or more wireless access points of the plurality of access points in the WLAN that are not providing wireless connectivity to any client devices within the WLAN.

5. The method of claim 4, further comprising:
performing an upgrade of software associated with the one or more wireless access points that are not providing wireless connectivity to any client devices within the WLAN prior to the first upgrade.

6. The method of claim 1, wherein determining the first set of wireless access points and determining the second set of wireless access points comprises using Flexible Radio Assignment (FRA) techniques to detect redundant wireless connectivity.

7. The method of claim 1, wherein the determining the additional wireless access points includes determining the additional wireless access points such that the additional wireless access points do not include any of the first set of wireless access points and do not include any of the second set of wireless access points.

8. One or more non-transitory computer readable storage media encoded with instructions that, when executed by a processor of a network controller of a wireless local area network (WLAN) comprising a plurality of wireless access points, cause the processor to:
   determine a first set of wireless access points in the WLAN that provide redundant wireless connectivity to client devices;
   determine a second set of wireless access points in the WLAN among a remaining group of wireless access points of the plurality of access points excluding the first set of wireless access points that provide redundant wireless connectivity to client devices;
   perform a first upgrade of software associated with each wireless access point in the first set of wireless access points;
   upon completion of the first upgrade, perform a second upgrade of software associated with each wireless access point in the second set of wireless access points
   determine additional wireless access points among the plurality of wireless access points for which no redundant wireless connectivity to client devices of the WLAN is available;
   steer client devices connected to the additional wireless access points to contributor access points associated with the first set of wireless access points and/or the second set of wireless access points; and
   perform an upgrade of software for each of the additional wireless access points.

9. The one or more non-transitory computer readable storage media of claim 8, wherein while performing the first upgrade, the remaining group of wireless access points provides wireless connectivity to client devices within the WLAN.

10. The one or more non-transitory computer readable storage media of claim 8, wherein while performing the second upgrade, the first set of wireless access points including software upgraded by the first upgrade provides wireless connectivity to client devices within the WLAN.

11. The one or more non-transitory computer readable storage media of claim 8, further comprising instructions to cause the processor to:
   prior to determining the first set of wireless access points, determine one or more wireless access points of the plurality of access points in the WLAN that are not providing wireless connectivity to any client devices within the WLAN.

12. The one or more non-transitory computer readable storage media of claim 11, further comprising instructions to cause the processor to:
   perform an upgrade of software associated with the one or more wireless access points that are not providing wireless connectivity to any client devices within the WLAN prior to the first upgrade.

13. The one or more non-transitory computer readable storage media of claim 8, wherein the processor is configured to determine the first set of wireless access points and determine the second set of wireless access points using Flexible Radio Assignment (FRA) techniques to detect redundant wireless connectivity.

14. The one or more non-transitory computer readable storage media of claim 8, wherein the instructions to cause the processor to determine the additional wireless access points include instructions to cause the processor to determine the additional wireless access points such that the additional wireless access points do not include any of the first set of wireless access points and do not include any of the second set of wireless access points.

15. An apparatus comprising:
   a plurality of network ports configured to communicate with a plurality of wireless access points in a wireless local area network (WLAN);
   a memory;
   a processor coupled to the memory and to the plurality of network ports, wherein the processor is configured to:
      determine a first set of wireless access points in the WLAN that provide redundant wireless connectivity to client devices;
      determine a second set of wireless access points in the WLAN among a remaining group of wireless access points of the plurality of access points excluding the first set of wireless access points that provide redundant wireless connectivity to client devices;
      perform a first upgrade of software associated with each wireless access point in the first set of wireless access points;
      upon completion of the first upgrade, perform a second upgrade of software associated with each wireless access point in the second set of wireless access points
      determine additional wireless access points among the plurality of wireless access points for which no redundant wireless connectivity to client devices of the WLAN is available;
      steer client devices connected to the additional wireless access points to contributor access points associated with the first set of wireless access points and/or the second set of wireless access points; and
      perform an upgrade of software for each of the additional wireless access points.

16. The apparatus of claim 15, wherein while performing the first upgrade, the remaining group of wireless access points provides wireless connectivity to client devices within the WLAN.

17. The apparatus of claim 15, wherein while performing the second upgrade, the first set of wireless access points including software upgraded by the first upgrade provides wireless connectivity to client devices within the WLAN.

18. The apparatus of claim 15, wherein the processor is further configured to:
   prior to determining the first set of wireless access points, determine one or more wireless access points of the plurality of access points in the WLAN that are not providing wireless connectivity to any client devices within the WLAN.

19. The apparatus of claim 18, wherein the processor is further configured to:
   perform an upgrade of software associated with the one or more wireless access points that are not providing wireless connectivity to any client devices within the WLAN prior to the first upgrade.

20. The apparatus of claim 15, wherein the processor is configured to determine the first set of wireless access points and determine the second set of wireless access points using Flexible Radio Assignment (FRA) techniques to detect redundant wireless connectivity.

\* \* \* \* \*